US010009819B2

(12) United States Patent
Khay-Ibbat et al.

(10) Patent No.: US 10,009,819 B2
(45) Date of Patent: Jun. 26, 2018

(54) NETWORK CELL TRANSITIONS FOR VOLTE DEVICES AT CALL INITIATION

(71) Applicant: Apple Inc., Cupertino, CA (US)

(72) Inventors: Samy Khay-Ibbat, San Francisco, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/066,619

(22) Filed: Oct. 29, 2013

(65) Prior Publication Data

US 2014/0126544 A1 May 8, 2014

Related U.S. Application Data

(60) Provisional application No. 61/721,966, filed on Nov. 2, 2012.

(51) Int. Cl.
*H04W 28/02* (2009.01)
*H04W 36/30* (2009.01)
*H04W 40/08* (2009.01)
*H04W 48/18* (2009.01)

(52) U.S. Cl.
CPC ........... *H04W 36/30* (2013.01); *H04W 40/08* (2013.01); *H04W 28/0221* (2013.01); *H04W 48/18* (2013.01)

(58) Field of Classification Search
CPC ............. H04W 36/30; H04W 52/0245; H04W 52/245; H04W 28/0221; H04W 40/08; H04W 48/18; Y02B 60/50
See application file for complete search history.

(56) References Cited

U.S. PATENT DOCUMENTS

| 6,970,708 | B1* | 11/2005 | Raith | 455/440 |
| 8,639,214 | B1* | 1/2014 | Fujisaki | 455/406 |
| 2005/0014504 | A1* | 1/2005 | Iimori | 455/437 |
| 2008/0004023 | A1* | 1/2008 | Chen et al. | 455/436 |
| 2008/0268917 | A1* | 10/2008 | Chang et al. | 455/574 |
| 2009/0163212 | A1* | 6/2009 | Hall | H04W 36/32 455/438 |
| 2010/0330992 | A1* | 12/2010 | Bhattacharjee | H04W 52/028 455/436 |

(Continued)

*Primary Examiner* — Parth Patel
*Assistant Examiner* — Kai Chang
(74) *Attorney, Agent, or Firm* — Dickinson Wright RLLP

(57) ABSTRACT

Apparatus and methods of performing a network cell transition for a voice over long term evolution (VoLTE) capable mobile device. Initially, the mobile device can detect a call initiation event. Thereafter, the mobile device determines whether a radio signal power associated with its serving LTE network base station is less than a radio access technology (RAT) specific threshold (i.e., an LTE-specific threshold). In a scenario where the radio signal power is less than the RAT-specific threshold the mobile device can effectuate a transition to an available neighbor network base station employing a legacy RAT, prior to establishing a voice call. When the mobile device is in a radio resource control (RRC) connected mode the network cell transition may be associated with an induced network handover procedure. Alternatively, when the mobile device is in an RRC idle mode the network cell transition may be associated with network reselection procedure.

15 Claims, 10 Drawing Sheets

(56) References Cited

U.S. PATENT DOCUMENTS

| | | | |
|---|---|---|---|
| 2011/0021197 A1* | 1/2011 | Ngai | 455/436 |
| 2011/0141972 A1* | 6/2011 | Oh | H04L 29/12028 370/328 |
| 2011/0280217 A1* | 11/2011 | Drevon et al. | 370/331 |
| 2012/0182921 A1* | 7/2012 | Tsuboi | H04W 4/021 370/312 |
| 2012/0258707 A1* | 10/2012 | Mathias | H04W 36/30 455/426.1 |
| 2012/0275321 A1* | 11/2012 | Ruvalcaba | H04W 4/003 370/252 |
| 2012/0322497 A1* | 12/2012 | Navda | H04W 36/0083 455/525 |
| 2013/0012211 A1* | 1/2013 | Sander et al. | 455/438 |
| 2013/0021929 A1* | 1/2013 | Kim | 370/252 |
| 2013/0034080 A1* | 2/2013 | Yang et al. | 370/331 |
| 2013/0040645 A1* | 2/2013 | Nishida et al. | 455/436 |
| 2013/0044613 A1* | 2/2013 | Edara | H04W 76/026 370/252 |
| 2013/0084850 A1* | 4/2013 | Martin | H04W 24/10 455/423 |
| 2013/0128865 A1* | 5/2013 | Wu et al. | 370/331 |
| 2013/0189987 A1* | 7/2013 | Klingenbrunn et al. | 455/436 |
| 2013/0273965 A1* | 10/2013 | Jechoux et al. | 455/552.1 |
| 2013/0295939 A1* | 11/2013 | Wegmann | H04W 76/028 455/436 |
| 2013/0303171 A1* | 11/2013 | Jang | H04W 36/30 455/436 |
| 2013/0324114 A1* | 12/2013 | Raghothaman | H04W 76/023 455/426.1 |
| 2013/0328996 A1* | 12/2013 | Rawat | H04N 7/14 348/14.02 |
| 2013/0343347 A1* | 12/2013 | Andre-Jonsson | H04W 36/14 370/332 |
| 2013/0344872 A1* | 12/2013 | Nukala | H04W 36/14 455/437 |
| 2014/0066055 A1* | 3/2014 | Balakrishnan | H04W 48/18 455/432.1 |
| 2014/0078898 A1* | 3/2014 | Anchan et al. | 370/230 |
| 2014/0087723 A1* | 3/2014 | Cili | H04W 24/08 455/426.1 |
| 2014/0099955 A1* | 4/2014 | Nukala et al. | 455/436 |
| 2014/0187234 A1* | 7/2014 | Chou | H04W 52/0206 455/422.1 |
| 2014/0228032 A1* | 8/2014 | Jung et al. | 455/436 |
| 2014/0378142 A1* | 12/2014 | Xuan et al. | 455/437 |
| 2015/0043363 A1* | 2/2015 | Koskinen | H04W 16/14 370/252 |
| 2015/0049668 A1* | 2/2015 | Cho | H04W 48/18 370/328 |
| 2015/0282011 A1* | 10/2015 | Watfa | H04W 36/0022 370/332 |

\* cited by examiner

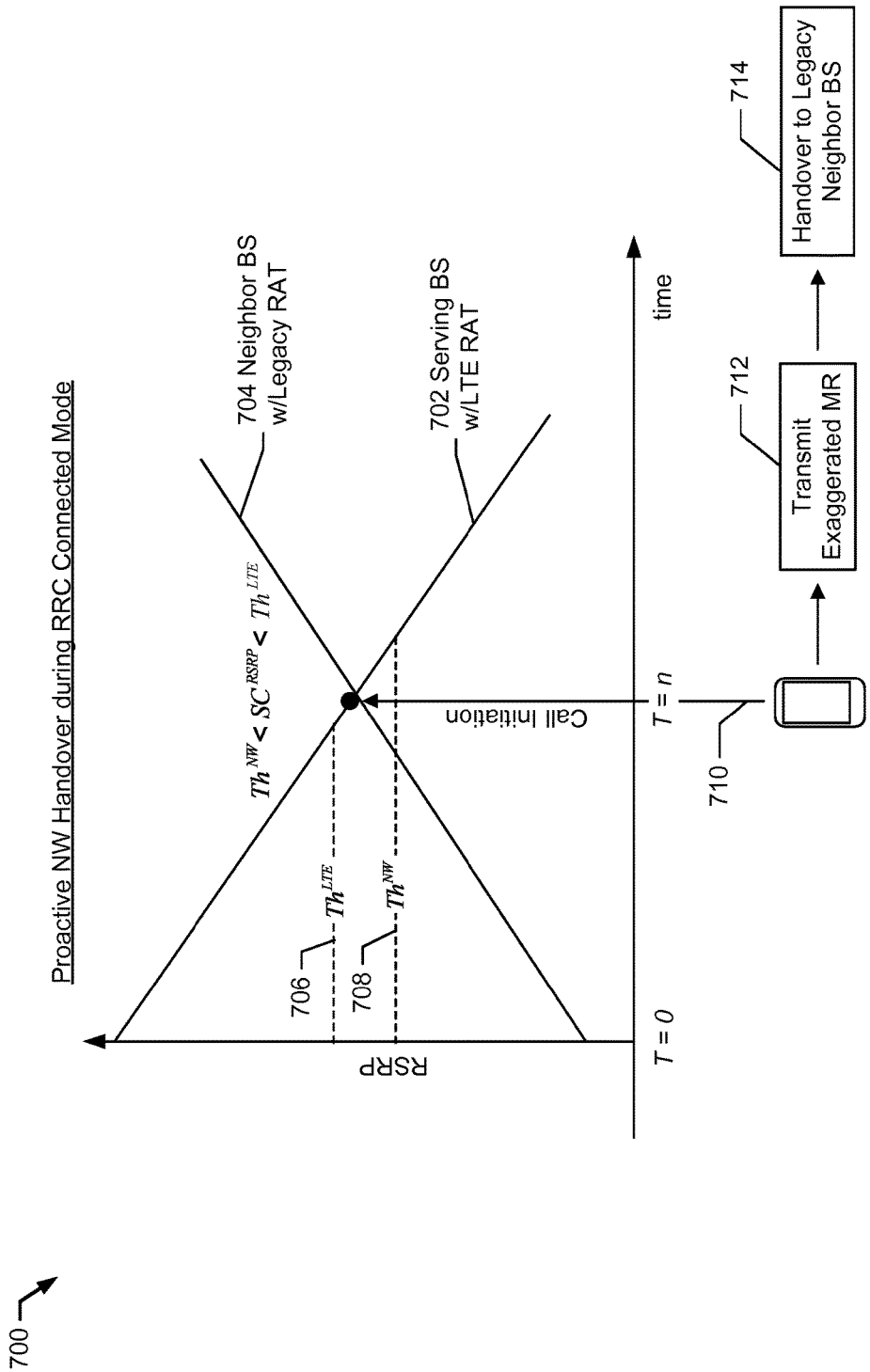

NETWORK CELL TRANSITIONS FOR VOLTE DEVICES AT CALL INITIATION

CROSS-REFERENCE TO RELATED APPLICATIONS

The present application claims the benefit of U.S. Provisional Application No. 61/721,966, filed Nov. 2, 2012, the content of which is incorporated herein by reference in its entirety.

TECHNICAL FIELD

The described subject matter generally relates to heterogeneous network cell reselection and handover procedures for a mobile device at a call initiation. These network cell reselection and handover procedures can be employed to prevent various call failure occurrences.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. LTE-A brings with it the aggregation of multiple component carriers (CCs) to enable this wireless communications standard to meet the communication bandwidth requirements of multi-carrier systems that cumulatively achieve data rates not possible by predecessor LTE versions.

Many different types of 4G LTE-compliant communication devices have been introduced into the consumer electronic device marketplace. Modern 4G communication devices are capable of communicating within heterogeneous telecommunication networks that employ a diverse mixture of 4G, third generation (3G), and second generation (2G) RAT systems. Accordingly, these multi-mode communication devices are configured with radio frequency (RF) circuitry that allows the devices to readily transition between LTE and LTE-A network cells, as well as to roam amongst and transition between various 3G and 2G legacy network cells. By way of example, 3G legacy RATs may include Universal Mobile Telecommunications System (UMTS)/High Speed Packet Access (HSPA) and Code Division Multiple Access (CDMA) 2000/1× Evolution-Data Only (1×EV-DO) systems, whereas 2G legacy RATs can include Global System for Mobile Communications (GSM)/Enhanced Data Rate for GSM Evolution (EDGE) systems.

Additionally, 4G multi-mode communication devices can be configured to perform different voice calling functions using either the packet-based voice-over LTE (VoLTE) communication protocol or a circuit-switched 3G or 2G legacy communication protocol. The choice of which communication protocol the mobile device is to utilize primarily depends on what RATs are available to the device at its present network location. For instance, when a multi-mode communication device is residing within the coverage area of an LTE or an LTE-A network cell, the device can be configured to initiate a voice call using the VoLTE communications protocol. However, in another scenario, when the same device is residing within the coverage area of a 3G or 2G legacy network cell and LTE network access is otherwise unavailable, the multi-mode device may be configured to initiate a voice call using a predecessor circuit-switched communications protocol.

Generally, multi-mode communication devices are configured to prefer attachment to 4G LTE networks offering relatively high data-rate throughput, as opposed to, attaching to 3G or 2G legacy networks offering substantially lower data-rate throughput. However, for voice calling, high data-rate throughput may not be necessary as voice calls are typically low-bandwidth, periodic communications. Accordingly, in certain scenarios, it may be more efficient for a mobile device to establish a voice call using a network cell with the most reliable radio coverage at the device's present location, as opposed to establishing the voice call using a network cell that employs a 4G RAT (offering a higher data-rate throughput) but has less reliable radio coverage at the device's current location. This scenario may exist when a multi-mode communication device is residing within, or is moving into, a cell edge region of an LTE network cell, where one or more overarching 3G or 2G network cell(s) can offer the multi-mode communication device more reliable voice calling service.

Moreover, some network operators with 4G LTE and LTE-A system deployments support VoLTE calling without enforcing VoLTE call continuity, such as in situations where a mobile device that is engaged in a VoLTE call roams outside the coverage area of its serving LTE network cell. In this scenario, a corresponding VoLTE call will be dropped at a time when LTE communications service is lost by the roaming device.

Accordingly, in the absence of strict call continuity enforcement by network operators, there is a need for an improved device mobility solution to prevent dropped calls when VoLTE-compliant mobile communication devices roam into regions with sparsely deployed, intermittently deployed, or no deployed 4G LTE network cells.

SUMMARY

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

Some embodiments disclosed herein provide for proactive network cell transitions for a voice over long term evolution (VoLTE) capable mobile device. Initially, the mobile device can detect a call initiation event, e.g., at a time when a mobile device user attempts to send or receive a voice call. Thereafter, the mobile device can determine whether a current radio signal power associated with its serving LTE network base station is less than a radio access technology (RAT) specific threshold, i.e., an LTE-specific threshold. In a scenario where the radio signal power of the serving LTE network base station is determined to be less than the RAT-specific threshold, the mobile device can effectuate a transition to an available neighbor network base station employing a legacy RAT, prior to establishing the voice call, i.e., a voice call that is associated with the call initiation event.

In some scenarios, when the mobile device is in a radio resource control (RRC) Connected Mode, the network cell transition may be an induced network handover procedure. Alternatively, when the mobile device is in an RRC Idle Mode the network cell transition may be a network reselection procedure.

In accordance with one aspect of the disclosure, a serving network base station may employ an LTE RAT or LTE-A RAT, while one or more neighbor network base stations offering communications coverage to the mobile device at the same location may employ various legacy RATs (e.g., RATs associated with UMTS/HSPA, CDMA 2000 1×EV-DO, GSM Edge, etc.) that are different than the employed 4G RAT of the serving network base station.

In accordance with another aspect, the mobile device can be a multi-mode communication device that is capable of VoLTE communications with the serving network base station and circuit-switched voice calling communications with the one or more neighbor network base stations.

In a particular scenario, the transitioning of the mobile device from its serving network base station to a neighbor network base station of the one or more neighbor network base stations can occur via a network handover procedure when the mobile device is in RRC Connected Mode. This network handover procedure may include the mobile device generating an exaggerated measurement report having a modified radio signal power value, e.g., a reference signal received power (RSRP) that is purposefully increased to influence a network handover decision, associated with the serving network base station, or a modified radio signal power value, e.g., an artificially increased RSRP, associated with the neighbor network base station, and then transmitting the exaggerated measurement report to the serving network base station to trigger a handover of the mobile device from the serving network base station to the neighbor network base station, prior to establishing a voice call.

In another scenario, the transitioning of the mobile device from its serving network base station to a neighbor network base station may occur via a network reselection procedure when the mobile device is in an LTE RRC Idle Mode. The network reselection procedure can include the mobile device autonomously performing a network reselection to the neighbor network base station (e.g., without instruction from the serving network base station), prior to establishing a voice call.

In accordance with an aspect of the disclosure, the RAT-specific threshold can be a network cell transition threshold that is stored at the mobile device. Further, the RAT-specific threshold can be different than a network handover threshold that is RAT-generic.

In various implementations, a network operator can provision a mobile device with both RAT-specific thresholds and RAT-generic thresholds via the mobile device's serving network base station, e.g., an LTE enhanced NodeB (eNodeB) base station. For instance, the eNodeB can utilize its RRC functionality to provision such thresholds to the mobile device within an RRC Configuration message or within an RRC Reconfiguration message.

In this manner, a mobile device can be configured to make network transition decisions, e.g., network cell reselection or network cell handover decisions, for specific RATs (e.g., for 4G LTE and LTE-A RATs with relatively small radio coverage areas and/or low radio coverage reliability), independent from other network transition decisions that can be generically applied to 4G, 3G, and 2G RATs, in an indiscriminate manner.

In accordance with one aspect, a method for effectuating a network cell transition at a mobile device prior to establishing a voice call, may include, but is not limited to, a mobile device periodically measuring a RSRP of a first network base station, and then comparing the measured RSRP of the first network base station to a RAT-specific threshold. Thereafter, the procedure can progress with mobile device transitioning from the first network base station to a second network base station when the measured RSRP of the first network base station is determined to be less than the RAT-specific threshold. After the network cell transition, the mobile device can establish the voice call via the second network base station.

In another aspect, the mobile device may be a multi-mode communication device that is capable of VoLTE communications with the first network base station and circuit-switched voice communications with the second network base station.

In a particular scenario, the transitioning of the mobile device from the first network base station to the second network base station can occur via a network handover procedure when the mobile device is in an RRC Connected Mode. In another scenario, the transitioning of the mobile device from the first network base station to the second network base station can occur via a network reselection procedure when the mobile device is operating in an RRC Idle Mode.

In accordance with a further aspect of the disclosure, a wireless communication device having a radio frequency (RF) circuit, a processor(s) coupled to the RF circuit, and a memory coupled to the processor(s), may be configured to employ its processor(s) to execute computer-executable instructions stored within the memory to cause the device to periodically measure a RSRP of a serving network base station, compare the measured RSRP of the serving network base station to a RAT-specific threshold, transition from the serving network base station to a neighbor network base station when the RSRP of the serving network base station is less than the RAT-specific threshold, and then establish a voice call via the neighbor network base station.

In accordance with another aspect, the wireless communication device may be a multi-mode communication device that is capable of VoLTE communications with the serving network base station and circuit-switched voice communications with the neighbor network base station.

In one scenario, the transition of the wireless communication device from the serving network base station to the neighbor network base station can occur via a network handover procedure when the wireless communication device is in RRC Connected Mode. In another scenario, the transition of the wireless communication device from the serving network base station to the neighbor network base station can occur via a network reselection procedure when the device is in RRC Idle Mode.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 7a illustrates graph depicting a device mobility scenario for a UE operating in RRC Connected Mode, when at call initiation a RSRP of a serving LTE network base station is below a RAT-specific threshold and above a RAT-generic threshold, thereby triggering a network handover procedure in accordance with some embodiments of the disclosure.

DETAILED DESCRIPTION

Figure 1:
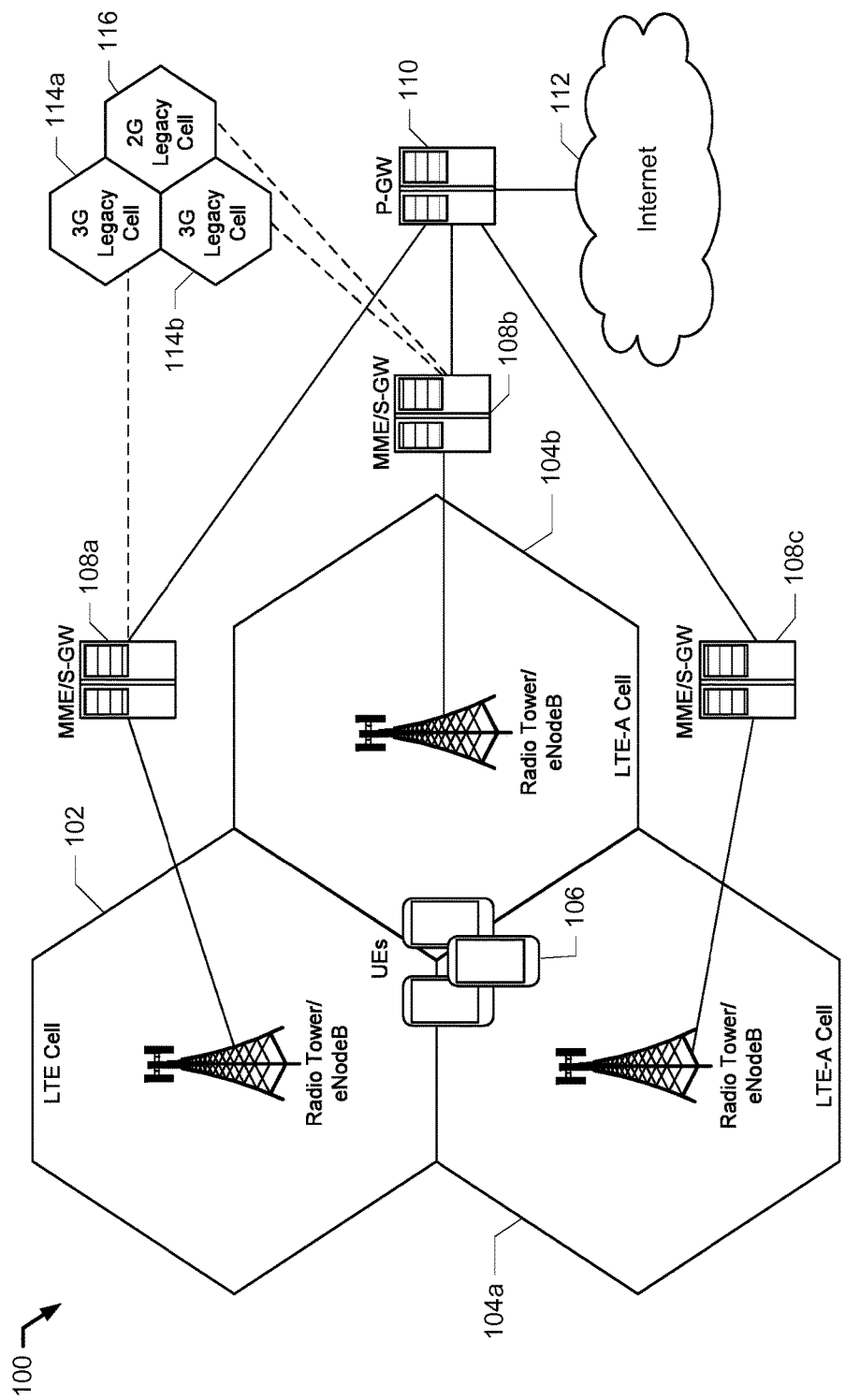
FIG. 1 illustrates a wireless communication system including a mixture of 4G Long Term Evolution (LTE), 3G legacy, and 2G legacy network cells that support multiple user equipment (UE) devices that may be configured to perform various proactive network cell transition procedures at voice call initiation, in accordance with various embodiments of the disclosure.

Representative examples for implementing proactive network cell transition procedures at call initiation for voice over long term evolution (VoLTE) compliant communication devices are described within this section. Additionally, various examples for performing autonomous network cell reselections and induced network cell handovers for multi-mode communication devices are also described herein. These examples are provided to add context to, and to aid in the understanding of, the subject matter of this disclosure. It should be apparent to one having ordinary skill in the art that the present disclosure may be practiced with or without some of the specific details described herein. Various modifications and/or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "communication device," "mobile device," "multi-mode communication device," "multi-mode device," and "user equipment" (UE) may be used interchangeably herein to describe one, or any number of, common consumer electronic devices that may be capable of performing various procedures associated with the proactive network cell transitions and voice call communications of the disclosure. These communication devices can include, but not limited to including: cellular phones or smart phones, tablet computers, laptop computers or netbook computers, media player devices, electronic book devices, MiFi® devices, as well as any other type of electronic computing device having fourth generation (4G) LTE or LTE Advanced (LTE-A) communication capabilities, as well as various third generation (3G) and second generation (2G) communications capabilities.

In various implementations, a UE that is compliant with multiple, different communication protocols can operate as a multi-mode device by communicating within a 4G network cell employing any common type of LTE or LTE-A radio access technology (RAT), as well as within a 3G or 2G network cell employing any common type of legacy RAT. In some scenarios, a corresponding multi-mode communication device can be configured to prefer attachment to an LTE network offering faster data rate throughput, as compared to other 3G or 2G legacy networks offering lower data rate throughput. However, in other implementations when a 4G LTE network is otherwise unavailable at a UE's present location, or when the UE is roaming away from an LTE radio coverage area, the UE may be configured to prefer attachment to a more reliable 3G or 2G legacy network for the purpose of establishing a voice call. As will be described in further detail herein, this network attachment preference can be selectively implemented at call initiation to prevent a future voice call from being dropped.

FIG. 1 depicts a heterogeneous wireless communication system 100 that is compliant with the 3GPP Evolved Universal Terrestrial Radio Access (E-UTRA) air interface, and includes, but is not limited to, one LTE network cell 102 and two LTE-A network cells 104a-b, respectively having enhanced NodeB (eNodeB) base stations that can communicate between and amongst each other via an X2 interface. Further, the heterogeneous, E-UTRA-compliant communication system 100 can include any number of mobility management entities (MMEs) 108a-c, serving gateways (S-GWs) 108a-c, PDN gateways (P-GWs) 110, etc., which, as part of the evolved packet core (EPC), can communicate with any of the LTE and LTE-A cell eNodeBs, 102 and 104a-b, via an S1 interface.

In various embodiments, the heterogeneous system 100 may also be compliant with any number of 3G or 2G air interfaces, and as such, the system 100 can include any number of 3G legacy network cells 114a-b and any number 2G legacy network cells 116. Additionally, the heterogeneous wireless communication lsystem 100 may include multiple UEs 106 that may be respectively provided wireless communications service by any of the LTE 102 and LTE-A 104a-b network cells, as well as by any of the 3G or 2G legacy network cells, 114a-b and 116, at any particular time based in part on a corresponding UE's 106 geographic location within the heterogeneous wireless communication system 100.

By way of example, a UE 106 may be located within an LTE 102 or an LTE-A 104a-b network cell and in an LTE radio resource control (RRC) Connected Mode when a user of the UE 106 initiates a VoLTE application to attempt to establish a VoLTE call. The UE 106 running the VoLTE application can thereafter establish the VoLTE call with an intended recipient by communicating voice call data to a serving eNodeB within the LTE 102 or LTE-A 104a-b network cell. The corresponding eNodeB can then forward the VoLTE data through the EPC, 108a-c and 110, and thereby connect to the Internet 112 to transfer the VoLTE packet-based communications through an Internet Multimedia Subsystem (IMS) network, between the caller UE 106 and the device of the intended recipient, which may be a part of a remote network.

Alternatively, the UE 106 may be located within an LTE 102 or an LTE-A 104a-b network cell and in an LTE RRC Idle Mode when a user of the UE 106 initiates a VoLTE application to attempt to establish a VoLTE call. The UE 106 running the VoLTE application may exit the RRC Idle mode by performing a network selection or reselection operation whereby the UE 106 can camp onto or attach to the LTE network cell 102 or the LTE-A network cell 104a-b. In this manner, the UE 106 can enter the RRC Connected Mode, before the UE 106 attempts to establish a VoLTE call with an intended recipient by communicating VoLTE data with its serving eNodeB within the LTE 102 or LTE-A 104a-b network cell.

In the above examples, the LTE-compliant UE 106 was described as either being in RRC Connected Mode or RRC Idle Mode at the time the UE 106 detected the occurrence of a call initiation event. Generally, when a UE 106 is in RRC Connected Mode and is already in communication with an LTE network cell, 102 or 104a-b, the UE 106 will attempt to establish a VoLTE call via its serving eNodeB. However, when the UE 106 is in RRC Idle Mode it is presumed that the UE 106 is not actively communicating within an LTE network cell, 102 or 104a-b. Accordingly, the UE 106 will need to attach to, or reattach to, an LTE network cell, 102 or 104a-b, prior to attempting to establish a VoLTE call via its serving eNodeB.

Further, in various embodiments, a UE 106 may be roaming within a network region that is densely populated with 4G LTE 102 and/or LTE-A 104a-b network cells while the UE 106 is actively engaged in VoLTE call. At a certain instance, the UE 106 may be near the edge region of its serving LTE 102 or LTE-A 104a-b network cell, when the UE 106 identifies a network handover condition associated with the occurrence of a network handover trigger event that can be associated with a RAT-generic network handover threshold, as described further herein. In response to detecting the occurrence of the handover trigger event, the UE 106 can automatically generate a measurement report (MR) to send to its serving eNodeB base station to inform the serving eNodeB of the UE's 106 signal strength and/or signal quality measurements that may be associated with the serving eNodeB and with any number of neighbor eNodeBs that can also support VoLTE communications for the roaming UE 106.

After receiving the measurement report from the UE 106, the serving eNodeB can identify a target neighbor eNodeB for a network handover procedure, and then collaborate with the target eNodeB, via the X2 interface, to carry out the intra-LTE handover (e.g., an LTE X2-based handover). Alternatively, when the X2 interface is otherwise unavailable between the serving eNodeB and the target neighbor eNodeB, the serving eNodeB may communicate with its source MME, which can thereafter collaborate with a target MME (associated with the target neighbor eNodeB) to carry out the intra-LTE handover (e.g., an LTE S1-based handover). In either scenario, the MR from the UE 106 to its serving eNodeB may be utilized to initiate the corresponding handover procedure, in response to the UE 106 identifying the occurrence of the handover trigger event.

It should be understood that the present disclosure describes various scenarios, where an LTE-compliant UE 106 can make proactive network transition determinations at call initiation, e.g., in response to a call initiation event, such as when a user initiates a voice calling application at a UE 106 or a when an incoming call or a call request is detected at by a UE. In various embodiments, a multi-mode UE 106 can react to a detected call initiation event, by determining whether a voice call associated with the call initiation event should be established as a VoLTE call via a 4G LTE network or whether a voice call associated with the call initiation event should be established as a circuit-switched voice call via an available 3G or 2G legacy network.

In some embodiments, a UE 106 can induce a network handover procedure after detecting the occurrence of a handover trigger event associated with a RAT-specific network handover threshold at call initiation. In this situation, the UE 106 can generate an exaggerated MR to cause the UE's 106 serving eNodeB to negotiate a proactive network cell handover to a particular neighbor network base station that is associated with a 3G or 2G legacy RAT. The exaggerated MR can be transmitted from the UE 106 to its serving eNodeB to initiate the corresponding proactive handover procedure, prior to the UE 106 establishing a circuit-switched voice call via the 3G or 2G legacy network.

As would be understood by those skilled in the art, a VoLTE call is communicated via a backbone data network, such as the Internet, as a packet-based voice communication. In contrast, a voice call that is communicated via a 3G or 2G legacy network is typically communicated via a backbone voice network, such as the public-switched telephone network (PSTN) as a circuit-switched communication. Unfortunately, some network operators do not support switching an active VoLTE packet-based call to a circuit-switched call via a 3G or 2G legacy network, as this data-type negotiation is a complicated procedure that can waste valuable network resources. Accordingly, in some situations, when a UE 106 that is engaged in a VoLTE call roams into a region where LTE communications are no longer available, the VoLTE call will simply drop. Thereafter, the user of the UE 106 may need to establish a new voice call with the same intended recipient as a circuit-switched call using an available 3G or 2G legacy network. The embodiments of the present disclosure can be implemented in various manners to prevent this call failure scenario, which can occur in the absence of call continuity enforcement by a network operator.

Figure 2:
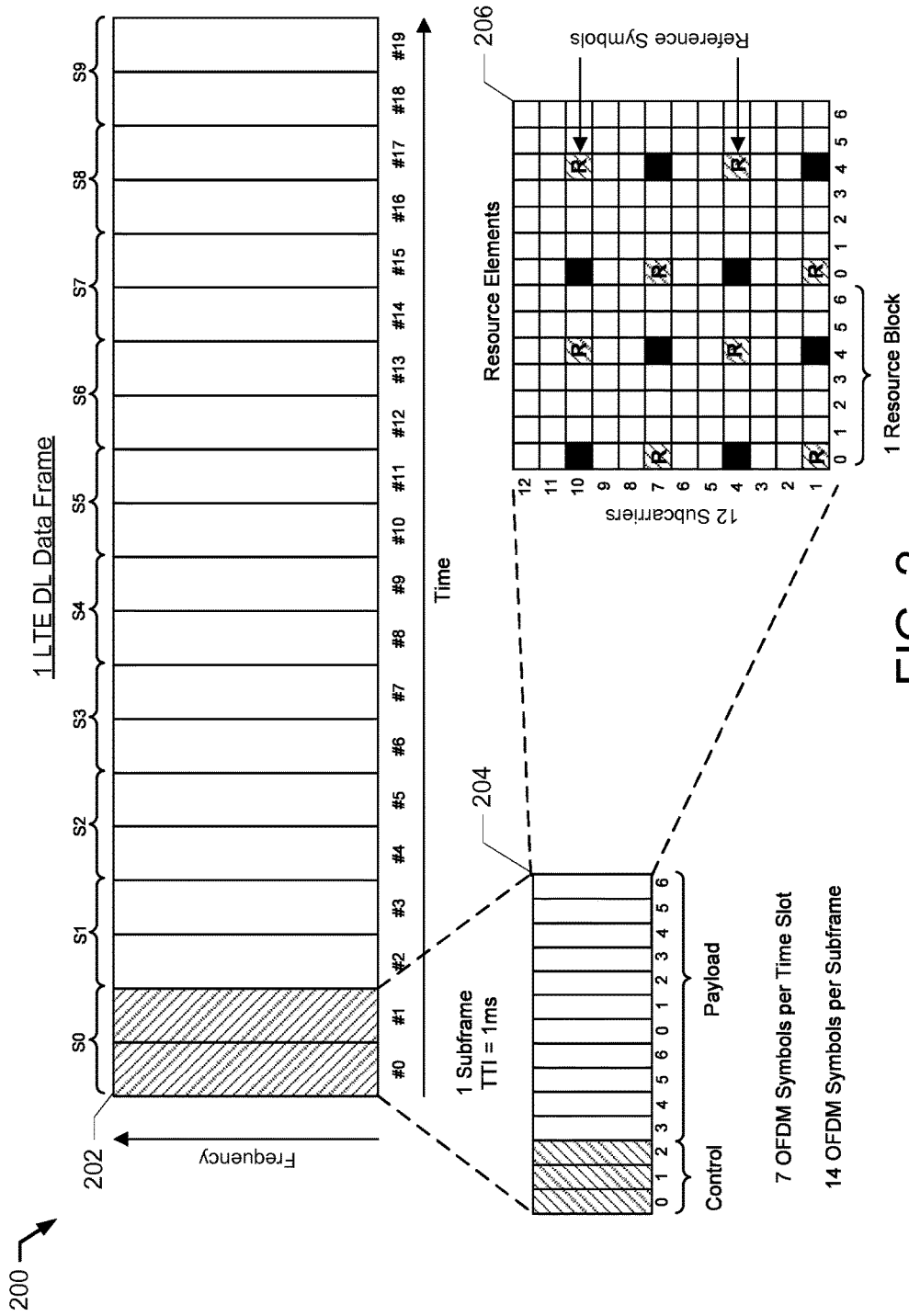
FIG. 2 illustrates a block diagram depicting a single LTE downlink (DL) data frame including a subframe-level resource block characterization having DL reference symbols that can be measured by a UE to determine a reference signal received power (RSRP) of a network base station, in accordance with various implementations of the disclosure.

FIG. 2 illustrates a block diagram 200 depicting a single LTE data frame structure 202 in accordance with various implementations of the disclosure. As would be understood by those skilled in the art, one LTE data frame 202 includes 10 subframes, labeled S0 through S9, respectively having a transmission time interval (TTI) of 1 ms. each. Each LTE subframe is composed of two time slots having a TTI of 0.5 ms. each. Accordingly, there are 20 time slots, labeled #0 through #19, within each LTE data frame 202. For instance, the first subframe S0 204 of the LTE data frame 202 may be composed of 14 orthogonal frequency division multiplexing (OFDM) symbols, which equates to 7 OFDM symbols per time slot, #0 and #1, of subframe S0 204.

A first portion of the OFDM symbols (e.g., the first three OFDM symbols) of subframe S0 204 may be designated for control signaling information, and the remaining portion of the OFDM symbols of subframe S0 204 may be designated for payload data. It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of 5 µs, or an extended CP having a duration of 17 µs. Therefore, an LTE slot employing a normal CP will typically have 7 OFDM symbols; whereas, an LTE slot employing an extended CP (e.g., intended for use in larger suburban cells) will typically have 6 OFDM symbols. An LTE resource block (RB) is typically associated with 12 OFDM subcarriers transmitting for the duration of one LTE slot. Accordingly, a normal RB (associated with a normal CP) transmitting for 0.5 ms. will comprise 84 OFDM symbols (12 subcarriers×7 OFDM symbols) or resource elements (REs). Likewise, an extended RB (associated with an extended CP) transmitting for 0.5 ms. will comprise 72 REs (12 subcarriers×6 OFDM symbols).

Further, each LTE subframe (S0) can be mapped to a time-frequency grid that consists of two RBs 206, which are respectively composed of 12 consecutive LTE subcarriers over the duration of 7 OFDM symbols (symbols 0-6). An eNodeB can schedule a transmission for each RB during the duration of 1 slot (lasting 0.5 ms). Each RB can consist of either 82 resources elements (REs) for normal CP or 72 REs for extended CP. A RE is the smallest scheduled data unit in LTE, and it consists of one OFDM subcarrier during one OFDM symbol interval. Additionally, multiple reference symbols (RSs) are included within the subframe time-frequency grid 206 (e.g., per Tx antenna) to facilitate channel measurements and estimations, in a manner that will be described further herein.

Figure 3:
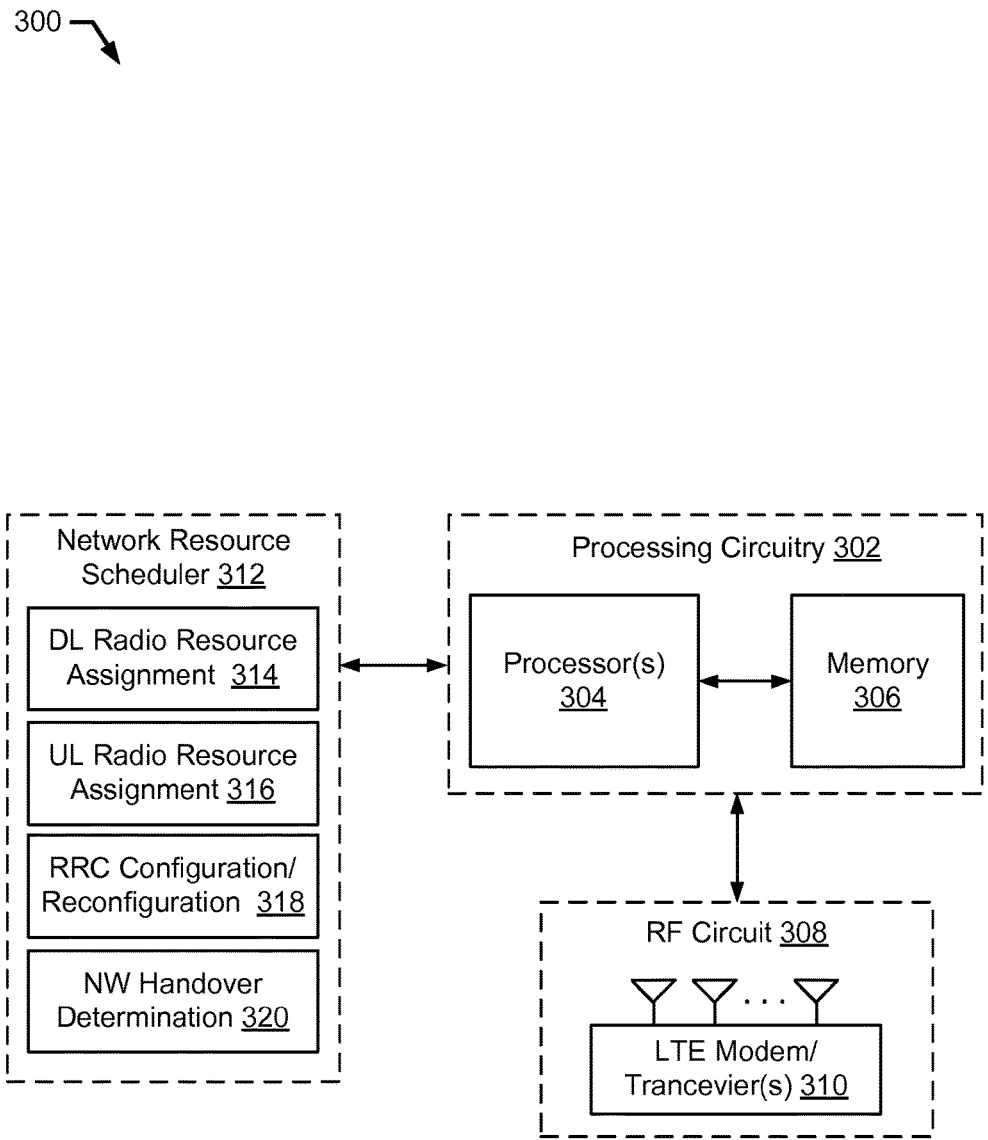
FIG. 3 illustrates a block diagram of a network apparatus including a network resource scheduler having a radio resource control (RRC) configuration/reconfiguration component and a network handover determination component, in accordance with some embodiments.

FIG. 3 illustrates a block diagram of a network apparatus 300 (e.g., an LTE eNodeB having RRC functionality) with a network resource scheduler 312 having a downlink (DL) radio resource assignment component 314, an uplink (UL) radio resource assignment component 316, an RRC configuration/reconfiguration component 318, and a network handover determination component 320, among other components, in accordance with various embodiments of the disclosure. In some implementations, the network resource scheduler 312 can be configured to utilize its DL radio resource assignment component 314 to generate and/or issue various DL radio resource assignments (e.g., carrier DL RB grants) to one or more UEs 106 located within its corresponding network cells (e.g., within an LTE cell 102 or within an LTE-A cell 104*a-b*). In other situations, the network resource scheduler 312 can also be configured to utilize its UL radio resource assignment component 314 to generate and/or issue various UL radio resource assignments (e.g., carrier UL RB grants) to one or more UEs 106 located within its corresponding network cells (e.g., within an LTE cell 102 or within an LTE-A cell 104*a-b*).

Further, the network resource scheduler 312 can be configured to employ its RRC configuration/reconfiguration component 318 to establish an RRC context for a UE 106 by providing the UE 106 with various network parameters and network information to enable the UE 106 to perform measurement and reporting operations, network selection and reselection operations, etc., as will be described further herein. In accordance with some implementations, the network resource scheduler 312 may be configured to employ its network handover determination component 320 to schedule and/or negotiate handovers for any number of UEs 106 communicating within a radio coverage area of the eNodeB 300.

Figure 5:
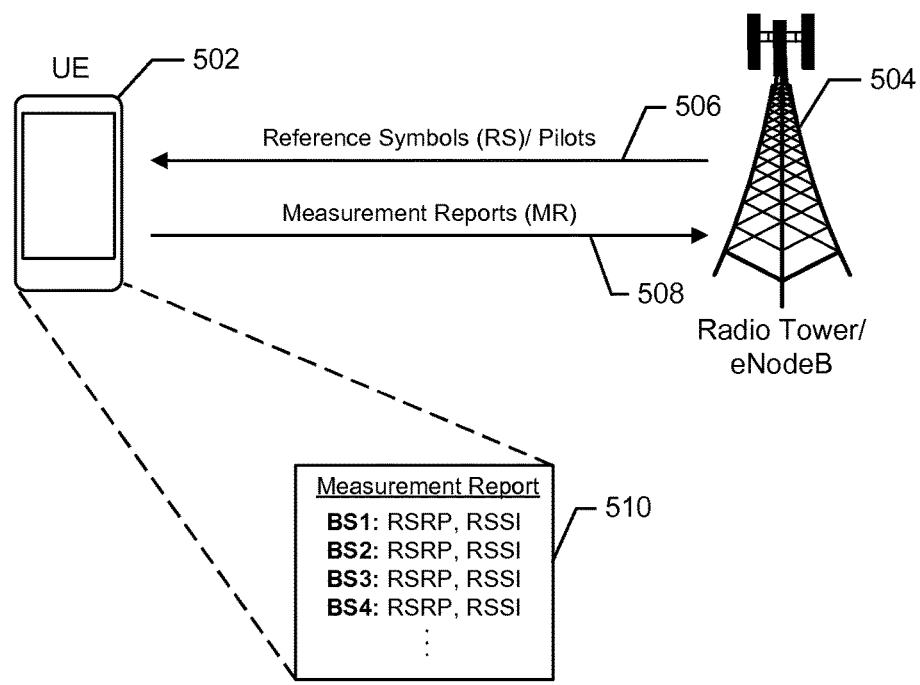
FIG. 5 illustrates a network diagram showing network measurement and reporting procedures between a UE and an eNodeB over the LTE-Uu air interface, in accordance with some embodiments of the disclosure.
Figure 7B:
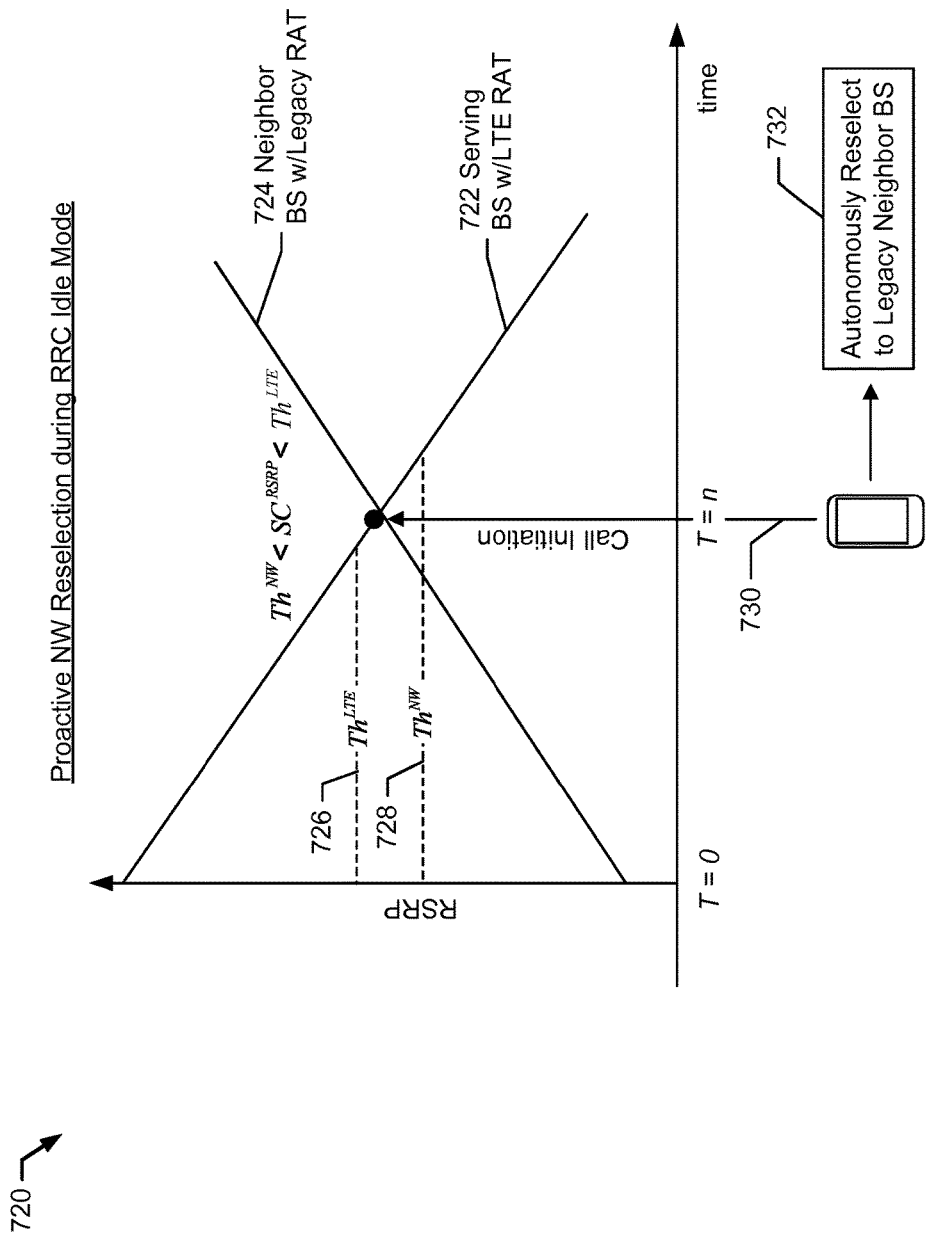
FIG. 7b illustrates graph depicting another device mobility scenario for a UE operating in RRC Idle Mode, when at call initiation a RSRP of a serving LTE network base station is below a RAT-specific threshold and above a RAT-generic threshold, thereby triggering an autonomous network reselection procedure in accordance with various embodiments.
Figure 8A:
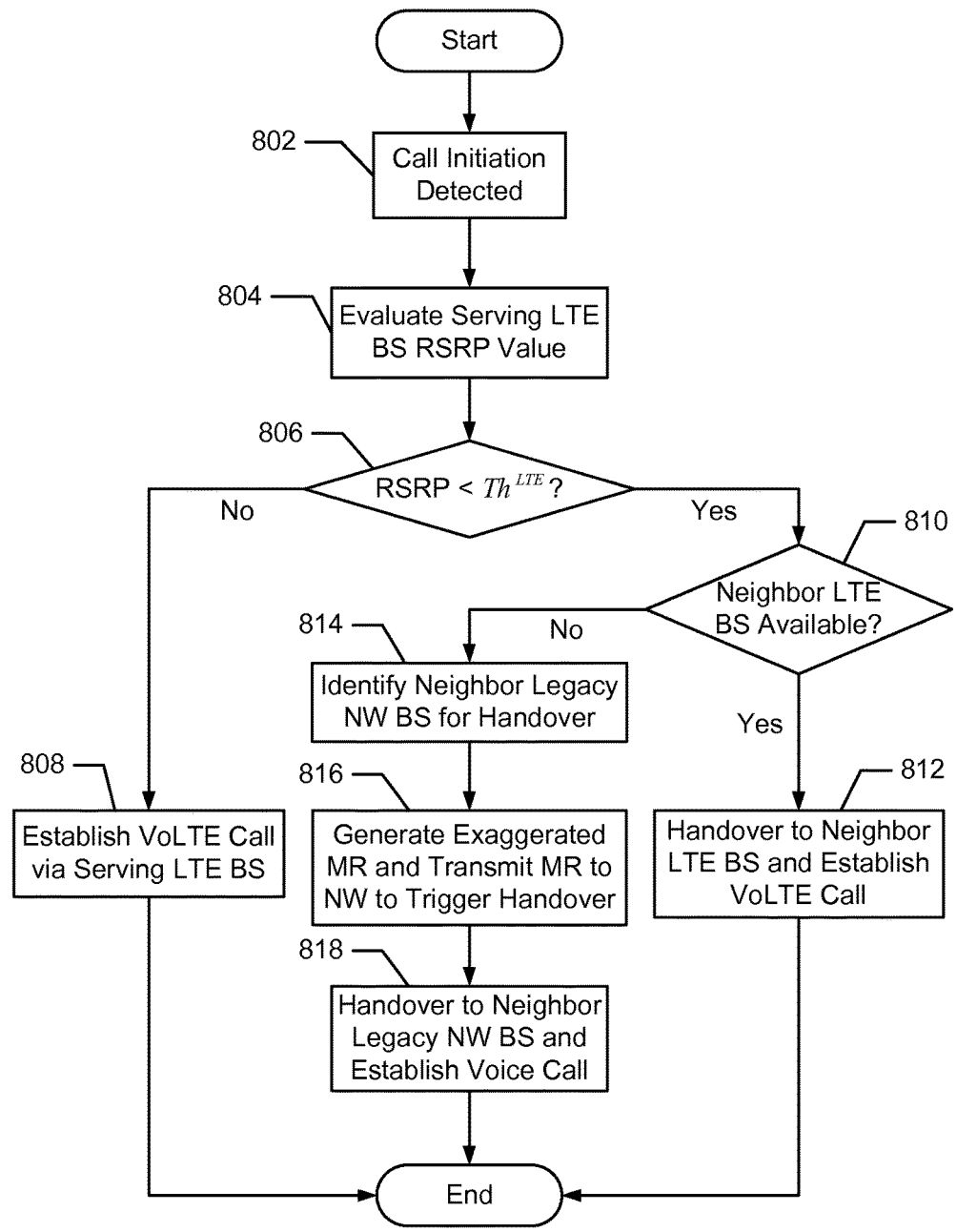
FIG. 8a illustrates a flowchart depicting example methods for performing a proactive network transition for a UE that is associated with an induced network handover, in accordance with some implementations of the disclosure.

As described further herein with respect to FIGS. 5, 7*a*, and 8*a*, in some embodiments, the network apparatus 300 may be an eNodeB 300 that can receive an exaggerated MR from a UE 106 that can induce the network resource scheduler 312 to employ its network handover determination component 320 to initiate a proactive handover to a legacy network cell prior to the UE 106 establishing a voice call. The eNodeB 300 may receive the exaggerated MR in response to an occurrence of a handover trigger event that can be detected at a UE 106 when a RAT-specific threshold has been breached, as described further herein. The eNodeB 300 can employ its network handover determination component 320 to evaluate the MR and determine how and when to schedule the corresponding handover. In various embodiments, the eNodeB 300 may employ its network resource scheduler 312 to carry out both X2-based handovers (e.g., with eNodeB coordination) and S1-based handovers (e.g., with MME coordination).

In some configurations, the network apparatus 300 (e.g., an eNodeB) can include processing circuitry 302 that can perform various proactive network cell handover scheduling actions, in accordance with one or more embodiments disclosed herein. In this regard, the processing circuitry 302 can be configured to perform and/or control performance of one or more functionalities of the network apparatus 300 in accordance with various implementations, and thus, the processing circuitry 302 can provide functionality for performing various network resource and communication scheduling procedures of the network apparatus 300 in accordance with some embodiments of the disclosure. The processing circuitry 302 may further be configured to perform data processing, application execution and/or other control and management functions according to one or more embodiments of the disclosure.

The network apparatus 300, or portions or components thereof, such as the processing circuitry 302, can include one or more chipsets, which can respectively include any number of coupled microchips thereon. The processing circuitry 302 and/or one or more other components of the network apparatus 300 may also be configured to implement functions associated with various dynamic network resource scheduling procedures, in accordance with various embodiments of the disclosure using multiple chipsets. In some scenarios, the network apparatus 300 may be associated with or employed as an eNodeB of an LTE 102 or an LTE-A cell 104*a-b* to operate within the wireless communication lsystem 100 of FIG. 1. In this implementation, the network apparatus 300 may include one or more chipsets configured to enable the network apparatus 300 to operate within the wireless communication lsystem 100 as a network base station (e.g., an LTE eNodeB), providing wireless communications service to any number of UEs 106 located within its corresponding wireless coverage area, e.g., a coverage area associated with either an LTE 102 or an LTE-A network cell 104*a-b*.

In some scenarios, the processing circuitry 302 of the network apparatus 300 may include one or more processor(s) 304 and a memory component 306. The processing circuitry 302 may be in communication with, or otherwise coupled to, a radio frequency (RF) circuit 308 having an LTE compliant modem and one or more wireless communication transceivers 310. In some implementations, the RF circuit 308 including the modem and the one or more transceivers 310 may be configured to communicate using different RAT types. For instance, in some embodiments the RF circuit 308 may be configured to communicate using an LTE RAT, and in other embodiments, the RF circuit 308 may be configured to communicate using an LTE-A RAT. Further, in various embodiments, the RF circuit 308 may also be configured to communicate using any number of different 3G legacy RAT types, as well as any number of 2G legacy RAT types.

In various implementations, the processor(s) 304 may be configured and/or employed in a variety of different forms. For example, the processor(s) 304 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 304 can be coupled to and/or configured in operative communication with each other and these components may be collectively configured to perform one or more procedures of the network apparatus 300 as described herein in the form of an eNodeB having RRC control functionality.

In some scenarios, the processors 304 can be configured to execute instructions that may be stored in the memory 306 or that can be otherwise accessible to the processors 304 in some other device memory. As such, whether configured as, or in conjunction with, hardware or a combination of hardware and software, the processors 304 of the processing circuitry 302 may be capable of performing operations according to various implementations described herein when configured accordingly.

In various embodiments, the memory 306 of the processing circuitry 302 may include multiple memory devices that can be associated with any common volatile or non-volatile memory type. In some scenarios, the memory 306 may be associated with a non-transitory computer-readable storage medium that can store various computer program instructions which may be executed by the processor(s) 304 during normal program executions. In this regard, the memory 306 can be configured to store information, data, applications, instructions, or the like, for enabling the network apparatus 300 to carry out various functions in accordance with one or more embodiments of the disclosure. In some implementations, the memory 306 may be in communication with, and coupled to, the processor(s) 304 of the processing circuitry 302, as well as one or more system buses for passing information between and amongst the different device components of the network apparatus 300.

It should be appreciated that not all of the components, device elements, and hardware illustrated in and described with respect to the network apparatus 300 of FIG. 3 may be essential to this disclosure, and thus, some of these items may be omitted, consolidated, or otherwise modified within reason. Additionally, in some implementations, the subject matter associated with the network apparatus 300 can be configured to include additional or substitute components, device elements, or hardware, beyond those that are shown within FIG. 3.

Figure 4:
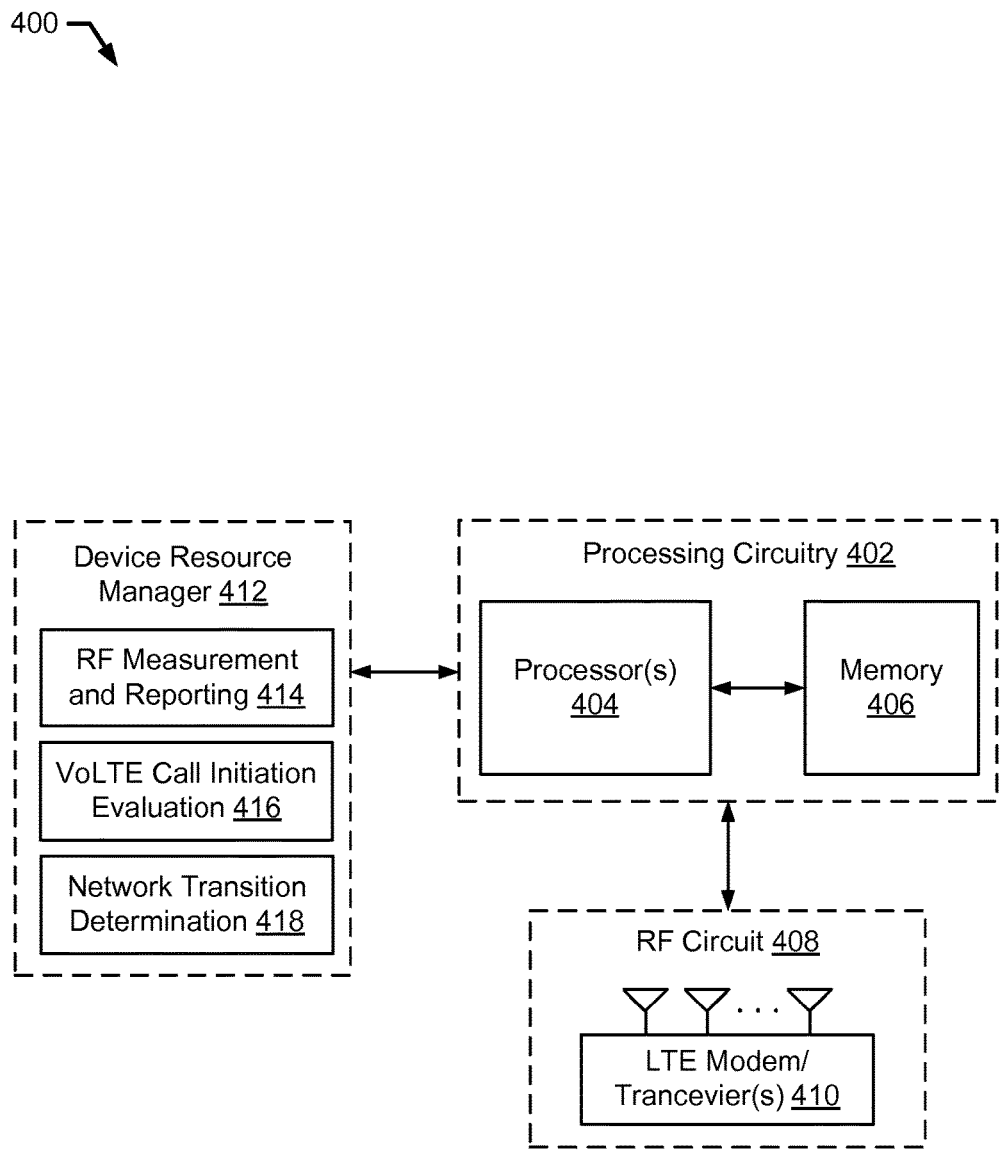
FIG. 4 illustrates a block diagram of a wireless communication device including a device resource manager having a radio frequency (RF) measurement and reporting component, a voice over LTE (VoLTE) call initiation determination component, and a network transition determination component, in accordance with some implementations of the disclosure.

FIG. 4 illustrates a block diagram of a communication device 400 (e.g., an LTE or LTE-A compliant UE) including an RF circuit 408 having one or more transceiver(s) and an LTE modem 410, as well as, a device resource manager 412 including an RF measurement and reporting component 414, a VoLTE call initiation evaluation component 416, and a network transition determination component 418 in accordance with some embodiments of the disclosure, which are described further herein. In various configurations, the communication device 400 can include processing circuitry 402 that can perform various network cell transition procedures, described further herein with respect to FIGS. 5-8b.

Further, the processing circuitry 402 of the communication device 400 can employ the RF measurement and reporting component 414 to perform various wireless signal received power and received quality measurements (e.g., of various Tx RSs to determine RSRP and/or RSSI/RSRQ metrics) of one or more network base station 300 downlink communications. The processing circuitry 402 of the communication device 400 can also employ RF measurement and reporting component 414 to report various radio signal measurements to a corresponding network apparatus 300 (e.g., to the UE's serving eNodeB). This may occur at a time when the UE's 400 VoLTE call initiation evaluation component 416 detects a voice call initiation event, e.g., in response to a user initiating a VoLTE application at the UE 400, and then the UE's network transition determination component 418 determines a handover trigger event has occurred when the UE 400 is in RRC Connected Mode, as described further herein.

Additionally, the processing circuitry 402 of the communication device 400 can employ the network transition determination component 418 of the network reselection scheduler 420 to carry out various autonomous network cell reselection procedures in response to determining a network reselection trigger event has occurred when the UE 400 is in RRC Idle Mode, as described further herein. In this regard, the processing circuitry 402 can be configured to perform and/or control performance of one or more functionalities of the communication device 400 in accordance with various implementations, and thus, the processing circuitry 402 can provide functionality for performing different proactive network cell transition procedures, in accordance with various scenarios that are described further herein. The processing circuitry 402 may further be configured to perform data processing, application execution and/or other control and management functions according to one or more embodiments of the disclosure.

The communication device 400, or portions or components thereof, such as the processing circuitry 402, can include one or more chipsets, which can respectively include any number of coupled microchips thereon. The processing circuitry 402 and/or one or more other components of the communication device 400 may also be configured to implement functions associated with various enhanced device mobility functions using multiple chipsets. In some scenarios, the communication device 400 may be associated with or employed as a multi-mode UE 106 of an LTE 102 or an LTE-A cell 104a-b to operate within the wireless communication lsystem 100 of FIG. 1. In this implementation, the communication device 400 may include one or more chipsets configured to enable the communication apparatus to communicate within the LTE or LTE-A cells, 102 and 104a-b, of the wireless communication system 100.

In various scenarios, the processing circuitry 402 of the communication device 400 may include one or more processor(s) 404 and a memory component 406. The processing circuitry 402 may be in communication with, or otherwise coupled to, a radio frequency (RF) circuit 408 having an LTE compliant modem and one or more wireless communication transceivers 408. In some implementations, the RF circuit 408 including the modem and the one or more transceivers 410 may be configured to communicate using different RAT types. For instance, in some embodiments the RF circuit 408 may be configured to communicate using an LTE RAT, and in other embodiments, the RF circuit 408 may be configured to communicate using an LTE-A RAT. Further, the RF circuit 408 may also be configured to communicate using any number of different 3G legacy RAT types, as well as any number of 2G legacy RAT types.

In some embodiments, the processor(s) 404 may be configured in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the communication device 400 can be coupled to and/or configured in operative communication with each other, and these components may be collectively configured to perform one or more procedures of the communication device 400 as described herein in the form of an LTE compliant UE 106.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device 400 to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device 400.

It should be appreciated that not all of the components, device elements, and hardware illustrated in and described with respect to the communication device 400 of FIG. 4 may be essential to this disclosure, and thus, some of these items may be omitted, consolidated, or otherwise modified within reason. Additionally, in some implementations, the subject matter associated with the communication device 400 can be configured to include additional or substitute components, device elements, or hardware, beyond those depicted within FIG. 4.

FIG. 5 illustrates a network diagram 500 depicting various network device signaling, measurement, and reporting procedures between a UE 502 and an eNodeB 504 (e.g., via the LTE-Uu interface), in accordance with some embodiments of the disclosure. It should be understood that the eNodeB 500 and the UE 502 depicted in FIG. 5 may be representative of the network apparatus 300 and the communication device 400 depicted in FIGS. 3 and 4. As described herein with respect to FIGS. 2 and 3, an eNodeB 504 can employ the DL radio resource assignment component 314 of its network resource scheduler 312 to schedule various LTE DL data communications over any number subframe slot intervals, in accordance with the resource element time-frequency resource mapping 206 of FIG. 2.

As previously described, these DL communications can include various RSs, or pilot signals, 506 which can be measured by a UE 502 using its RF circuit 408 and its RF measurement and reporting component 414, to allow the UE 502 and its serving eNodeB 504 to make various proactive network cell handover decisions, as well as various proactive network cell reselection decisions, as described further herein with respect to FIGS. 6-8b. For example, the UE 502 can employ its RF measurement and reporting component 414 to determine a reference signal received power (RSRP) along with a received signal strength indicator (RSSI) for its serving eNodeB 504 and for any number of neighbor base stations, e.g., neighbor network base stations that the UE 502 has detected as a result of a previous network search procedure. As would be understood by those skilled in the art, the RSRP metric can be defined as the average received signal power of the RSs received by the UE 502 from an eNodeB 504 during a particular time interval of interest.

Thereafter, the UE 502 can determine whether or not a network transition trigger event (e.g., a network handover or a network reselection trigger event) has occurred by evaluating the current RSRP of its serving eNodeB 504 and/or the current RSRP of one or more neighbor base stations 300, e.g., at call initiation using its network transition determination component 418 in conjunction with its VoLTE call initiation Evaluation component 416. In scenarios where the UE 502 determines that a network handover trigger event has occurred (e.g., when a RAT-specific handover has been breached), the UE 502 can generate a corresponding exaggerated MR 510 using its RF measurement and reporting component 414, which includes these RSRP measurements, and then transmit the event-triggered MR 510 to the UE's 502 serving eNodeB 504 to induce a proactive handover of the UE 400 to a neighbor 3G or 2G legacy network base station, prior to establishing a voice call.

In other scenarios, the UE 502 may be configured to periodically generate and transmit 508 scheduled MRs 510 (e.g., MRs including RSRP measurements pertaining to a serving eNodeB 504 and any number of neighbor network base stations) to its serving eNodeB 504, in the absence of any handover trigger events. In this situation, a non-event triggered MR 510 may still effectuate a network cell handover exclusive of various proactive network cell transition procedures described herein with respect to different embodiments of the disclosure. As some embodiments relate to autonomous network cell reselection procedures that can occur at the UE 400 in response to a call initiation event when the UE 400 is in RRC Idle Mode, it should be understood that the induced handover procedure, is just one example of a proactive network transition scenario that can occur in accordance with some embodiments of the disclosure.

Figure 6:
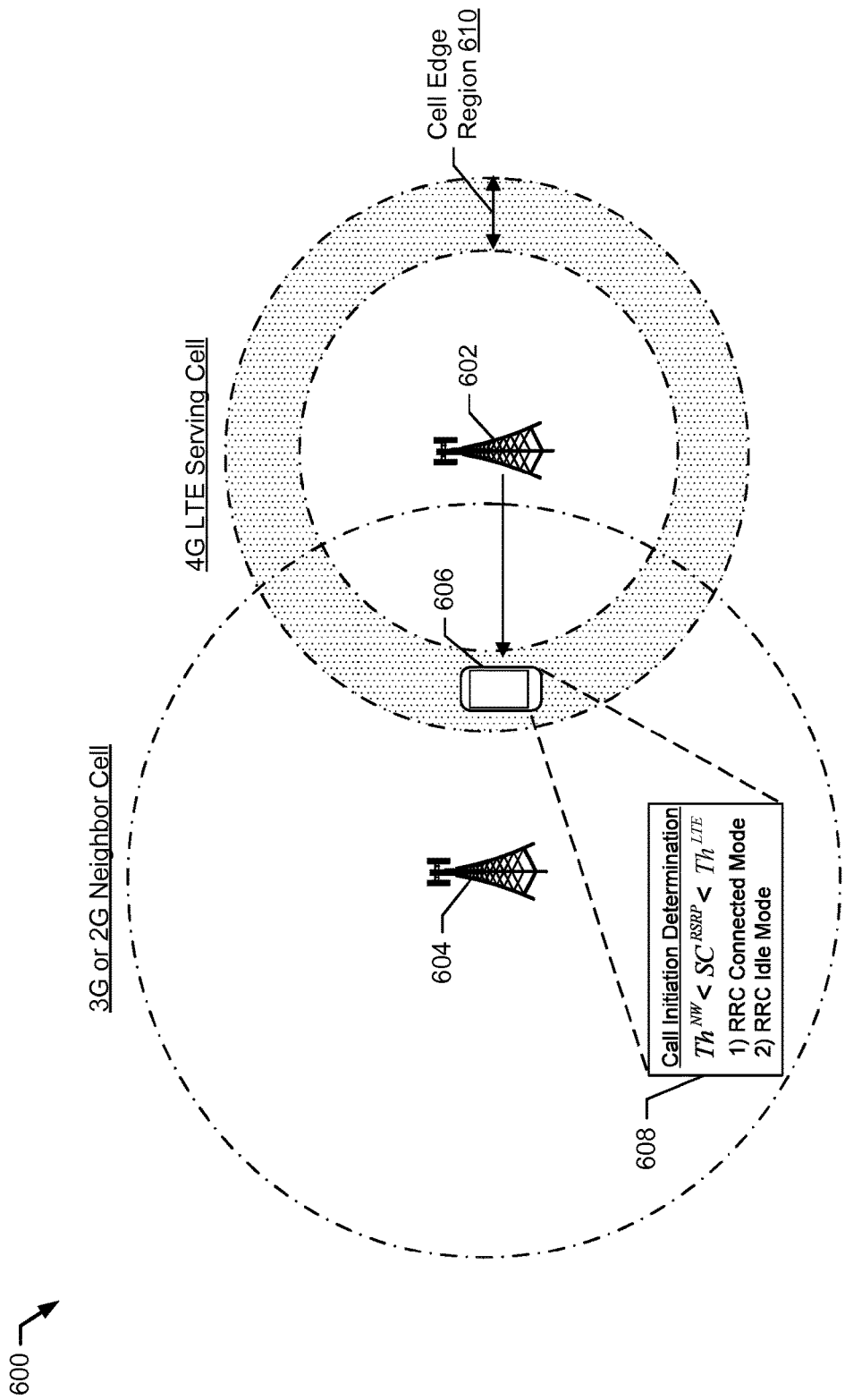
FIG. 6 illustrates a network diagram depicting a UE mobility scenario where a UE transitions from a serving 4G LTE network cell to a 3G or 2G legacy neighbor network cell, in accordance with various implementations of the disclosure.

FIG. 6 illustrates a network diagram depicting a UE mobility scenario 600 where a roaming UE 606 transitions from a serving 4G LTE network cell associated with a serving eNodeB 602 towards a 3G or 2G neighbor network cell associated with a legacy network base station 604, thereby triggering a proactive network cell transition procedure. In some embodiments, the proactive network cell transition can be triggered when the UE 606 determines that the RSRP of its serving eNodeB 602 drops below a network-designated RAT-specific threshold (e.g., a RSRP threshold associated with an LTE or LTE-A RAT). It should be understood that the serving LTE eNodeB 602 and the UE 606 depicted in FIG. 6 may be representative of the network apparatus 300 and the communication device 400 depicted in FIGS. 3 and 4.

By way of example, the UE 606 may be initially positioned near its serving eNodeB 602 within a first coverage area, where the UE 600 would likely experience good received signal strength, good received signal quality, and minimal network interference from neighboring cells, while communicating with its serving eNodeB 602. However, in a scenario where the UE 606 roams into a cell edge region 610 associated with its LTE serving network cell, the UE 606 could experience a significant amount of Tx radio signal path loss (e.g., for Tx communications from its serving eNodeB 602), as well as a substantial amount of interference from a neighbor network base station 604. This can occur in a mobility scenario where the UE 606 roams away from its serving eNodeB 602 and further into a 3G or 2G neighbor cell, near a neighbor network base station 604.

As would be understood by those skilled in the art, path loss (a.k.a., path attenuation) is associated with a reduction in power density of a radio signal as it propagates through space. Path loss is influenced by geographic terrain, environment, and a distance between a transmitter (e.g., eNodeB 602) and a receiver (e.g., a UE 606), and the height and location of or one or more transmitting radio antennas (e.g., antennas associated with the RF circuit 308 of an eNodeB 602).

In some embodiments, the UE 606 may be configured to periodically measure/monitor the RSRP of its serving eNodeB 602, as well as the RSRP(s) of one or more neighbor base stations 604, using its RF measurement and reporting component 414. At a certain instance, while the UE 606 is roaming away from its serving eNodeB 602, the UE 606 may identify the occurrence of a network measurement reporting event that could be associated with the breach of a RAT-generic threshold (e.g., any of the handover thresholds depicted in Table 1, below) or a RAT-specific threshold (e.g., a proactive network transition threshold that is different than the handover thresholds depicted in Table 1) when the UE 400 is operating in RRC Connected Mode.

By way of example, Table 1 recites a listing of various measurement reporting events that are associated with 3GPP LTE Release 8 and 3GPP LTE-A Release 10.

TABLE 1

| LTE and LTE-A Measurement Reporting Events |
| --- |
| Intra-system MR events: |
| A1 Serving cell > Threshold |
| A2 Serving cell < Threshold |
| A3 Neighbor cell > Serving cell by an offset |
| A4 Neighbor cell > Threshold |
| A5 Serving cell < Threshold 1; Neighbor cell > Threshold 2 |
| A6 Neighbor cell > Secondary cell by an offset |
| Inter-system MR events: |
| B1 Inter-system Neighbor cell > Threshold |
| B2 Serving cell < Threshold 1; Inter-system Neighbor cell > Threshold 2 |

In various implementations, when the UE 606 determines that its serving eNodeB 602 has an RSRP $SC^{RSRP}$ that is less than a RAT-specific threshold $Th^{LTE}$ (e.g., a proactive network transition threshold), and optionally greater than at RAT-generic network threshold $Th^{NW}$ (e.g., any of the handover thresholds depicted in Table 1), at call initiation, the UE 606 can make a call initiation determination 608 using its VoLTE call initiation evaluation component 416 in conjunction with its network transition determination component 418. As described above, when the UE 606 detects a call initiation event (e.g., when a user of the UE 606 initiates a VoLTE calling application or otherwise attempts to make a voice call at the UE 606), the UE's 606 network transition determination component 418 may compare the current RSRP $SC^{RSRP}$ of its serving eNodeB 602 to a RAT-specific threshold $Th^{LTE}$ at call initiation, prior to establishing a corresponding voice call.

In a scenario where the network transition determination component 418 determines that the current RSRP $SC^{RSRP}$ of its serving eNodeB 602 has dropped below the a RAT-specific threshold $Th^{LTE}$ (e.g., a proactive network transition threshold), the network transition determination component 418 can identify whether the UE is operating in RRC Connected Mode, e.g., in accordance with the scenarios depicted in FIG. 7a and 8a, or in RRC Idle Mode, e.g., in accordance with the scenarios depicted in FIGS. 7b and 8b. As described further herein, when the UE 606 is operating in RRC Connected Mode, a proactive network handover procedure can be initiated by the UE 606 when it is determined that the current RSRP $SC^{RSRP}$ of the serving eNodeB 602 has dropped below the a RAT-specific threshold $Th^{LTE}$ Alternatively, when the UE 606 is operating in RRC Idle Mode, a proactive network reselection procedure can be initiated by the UE 606 when it is determined that the current RSRP $SC^{RSRP}$ of the serving eNodeB 602 has dropped below the a RAT-specific threshold $Th^{LTE}$.

FIG. 7a illustrates a diagram 700 including a device mobility scenario for a UE 606 operating in RRC Connected Mode, when at call initiation a RSRP $SC^{RSRP}$ 702 of a serving LTE network base station 602 (e.g., a serving eNodeB) is below a RAT-specific threshold $Th^{LTE}$ 706, and optionally above a RAT-generic threshold $Th^{NW}$ 708, thereby triggering a proactive network cell handover procedure in accordance with some embodiments of the disclosure. At time T0, the RSRP $SC^{RSRP}$ 702 associated with a serving eNodeB 602 may be good, while at the same time, the RSRP 704 associated with a particular neighbor legacy network base station 604 may be poor. However, at a later time, the RSRP $SC^{RSRP}$ 702 associated with the serving eNodeB 602 may be decreasing, while at the same time, the RSRP 704 associated with the neighbor network base station 604 may be increasing. This phenomenon can occur when a UE 606 roams away from the coverage area associated with its serving eNodeB 602 and towards the coverage area associated with a neighbor network base station 604.

In accordance with some embodiments, at a particular time, T=n, a call initiation event 710 may be detected by the UE 606 using the VoLTE call initiation evaluation component 416. Shortly thereafter, the UE 606 (which is operating in RRC Connected Mode) can employ its network transition determination component 418 to determine whether the RSRP $SC^{RSRP}$ associated with its serving eNodeB 602 is below a RAT-specific threshold $Th^{LTE}$ 706, for the purpose of determining how best to establish an ensuing voice call associated with the call initiation event 710. In a scenario where the network transition determination component 418 determines that the RSRP $SC^{RSRP}$ associated with the serving eNodeB 602 is below the RAT-specific threshold $Th^{LTE}$ 706 (e.g., at a time when no other neighbor LTE eNodeBs are available to provide VoLTE communication service to the UE 606 at its present network location) the UE 606 can initiate a proactive network handover procedure.

To initiate the proactive network handover procedure, the UE 606 can transmit an exaggerated MR 712 to its serving eNodeB 602. The exaggerated MR may include a deflated RSRP (e.g., $SC^{RSRP}-X$) associated with the UE's 606 serving eNodeB 602, and optionally, one or more inflated RSRPs (e.g., $NC^{RSRP}+Y$) associated with any number of a neighboring legacy network base stations 604 available to the UE 606 at its present location. After the UE's 606 serving eNodeB 602 receives the exaggerated MR 712, the serving eNodeB 602 can negotiate a handover of the UE 606 to a neighbor 3G or 2G legacy network base station 604, as described in further detail herein for FIG. 8a.

FIG. 7b illustrates diagram 720 depicting another device mobility scenario for a UE 606 operating in RRC Idle Mode, when at call initiation a RSRP $SC^{RSRP}$ 722 of a serving LTE network base station 602 (e.g., a serving eNodeB) is below a RAT-specific threshold $Th^{LTE}$ 726, and optionally above a RAT-generic threshold $Th^{NW}$ 728, thereby triggering a network cell reselection procedure in accordance with some implementations of the disclosure. At an initial time T0, the RSRP $SC^{RSRP}$ 722 associated with a serving eNodeB 602 may be good, while at the same time, the RSRP 724 associated with a particular neighbor legacy network base station 604 may be poor. However, at a later time the RSRP $SC^{RSRP}$ 722 associated with the serving eNodeB 602 may be decreasing, while at the same time, the RSRP 724 associated with the neighbor network base station 604 may be increasing.

In accordance with some embodiments, at a particular time, T=n, a call initiation event 730 may be detected by the UE 606 using the VoLTE call initiation evaluation component 416. Shortly thereafter, the UE 606 (which is operating in RRC Idle Mode) can employ its network transition determination component 418 to determine whether the RSRP $SC^{RSRP}$ 722 associated with its serving eNodeB 602 is below a RAT-specific threshold $Th^{TE}$ 726, for the purpose of determining how best to establish an ensuing voice call associated with the call initiation event 730.

In a scenario where the network transition determination component 418 determines that the RSRP $SC^{RSRP}$ 722 associated with the serving eNodeB 602 is below the RAT-specific threshold $Th^{TE}$ 726 (e.g., at a time when no other neighbor LTE eNodeBs are available to provide VoLTE communication service to the UE 606 at its present network location) the UE 606 can initiate a proactive network reselection procedure To initiate the proactive network reselection procedure, the UE 606 can employ its network transition determination component 418 to identify a preferred neighbor legacy network base station 604. Thereafter the UE 606 can employ its network transition determination component 418 to reselect to the identified neighbor legacy network base station 604, as described in further detail herein for FIG. 8b.

FIG. 8a illustrates a flowchart depicting various procedures 800 for performing a proactive network transition that is associated with an induced network handover, in accordance with various implementations of the disclosure. In this regard, it should be understood that any or all of the procedures 800 depicted in FIG. 8a may be associated with a method, or methods, that can be implemented by the execution of computer program instructions stored in a non-transitory computer-readable memory 406 of a UE 400, optionally in conjunction with the execution of computer program instructions stored in a non-transitory computer-readable memory 306 of an eNodeB 300.

Initially, a UE 400 may be located near the periphery of a 4G LTE or LTE-A network cell (e.g., within a cell edge region 610 as depicted in FIG. 6) in RRC Connected Mode, and the UE 400 can be actively engaged in communications with a serving eNodeB 300 base station. At operation block 802, the UE 400 can detect a call initiation event, e.g., using its VoLTE call initiation evaluation component 416. In response to detecting the call initiation event, at operation block 804, the UE 400 can be configured to evaluate its serving eNodeB's 300 current RSRP, e.g., by employing its network transition determination component 418 to compare the current RSRP of its serving eNodeB 300 to a RAT-specific threshold.

Then at decision block 806, the UE 400 can determine whether its serving eNodeB's 300 current RSRP is less than a RAT-specific threshold (e.g., a proactively network handover threshold that is different than the RAT-generic handover thresholds depicted in Table 1). In a scenario where the UE 400 determines that its serving eNodeB's RSRP is not less than a RAT-specific threshold, at operation block 808, the UE 400 can establish a VoLTE call associated with the call initiation event via its serving eNodeB 300. In this situation, it is assumed that at the UE's 400 present location, the serving eNodeB 300 offers the UE 400 sufficient wireless LTE coverage to support various VoLTE calling functions.

Alternatively, in a scenario where the UE 400 determines that its serving eNodeB's 300 RSRP is less than a RAT-specific threshold, the UE 400 can be configured to determine if a neighbor LTE eNodeB base station is available to support a VoLTE call, at decision block 810. In a situation where a neighbor eNodeB is available to support a VoLTE call, at operation block 812, the UE 400 can be handed over to the available neighbor eNodeB, and then the corresponding VoLTE call can be established with the available neighbor eNodeB. Alternatively, in a situation where a neighbor eNodeB is not available to support a VoLTE call, at operation block 814, a neighbor legacy network base station can be identified for a handover, prior to establishing a voice call associated with the call initiation event.

Thereafter, at operation block 816, the UE 400 can generate an exaggerated MR, and transmit the exaggerated MR to its serving eNodeB 300 to trigger a handover to the neighbor legacy network base station, e.g., in the manner described above. Subsequently, at operation block 818, the UE 400 can be handed over to the neighbor legacy network base station, and a circuit-switched voice call associated with the call initiation event can be established with the neighbor legacy network base station.

Figure 8B:
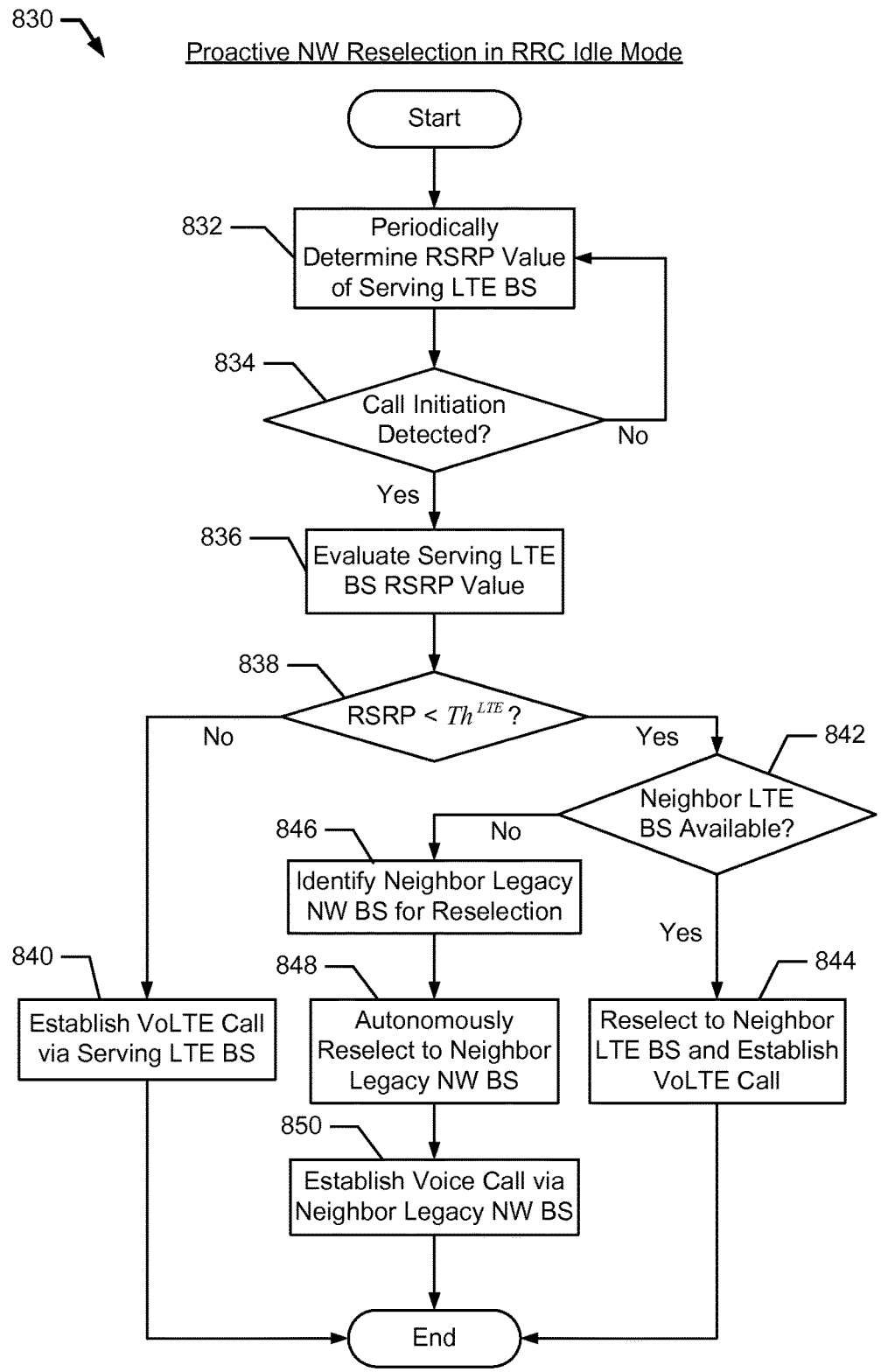
FIG. 8b illustrates a flowchart depicting example methods for performing a proactive network transition for a UE that is associated with an autonomous network reselection, in accordance with some embodiments of the disclosure.

FIG. 8b illustrates a flowchart depicting various procedures 830 for performing a proactive network transition that is associated with an autonomous network reselection at a UE, in accordance with some embodiments of the disclosure. In this regard, it should be understood that any or all of the procedures 830 depicted in FIG. 8b may be associated with a method, or methods, that can be implemented by the execution of computer program instructions stored on a non-transitory computer-readable memory 406 of a UE 400.

Initially, a UE 400 may be located near the periphery of a 4G LTE or LTE-A network cell (e.g., within a cell edge region 610 as depicted in FIG. 6) in RRC Idle Mode within a coverage area associated with its serving eNodeB 300. At operation block 832, the UE 400 can employ its RF measurement and reporting component 414 to periodically determine an RSRP associated with its serving eNodeB 300, as well as RSRPs associated with one or more neighboring network base stations. Next, at decision block 834, a determination is made as to whether a call initiation event has been detected at the UE 400. In a scenario where no call initiation events have been detected by the UE 400, the process reverts to operation block 832.

However, when a call initiation event has been detected by the UE 400, e.g., via the VoLTE call initiation evaluation component 416, at operation block 834, the UE 400 can be configured to evaluate its serving eNodeB's 300 current RSRP, e.g., by employing its network transition determination component 418 to compare the current RSRP of its serving eNodeB 300 to a RAT-specific threshold. Then at decision block 838, the UE 400 can determine if its serving eNodeB's 300 current RSRP is less than a RAT-specific threshold (e.g., a proactively network reselection threshold that is different than the RAT-generic handover thresholds depicted in Table 1). In a scenario where the UE 400 determines that its serving eNodeB's RSRP is not less than a RAT-specific threshold, at operation block 840, the UE 400 can establish a VoLTE call associated with the call initiation event via its serving eNodeB 300.

Alternatively, in a scenario where the UE 400 determines that its serving eNodeB's 300 RSRP is less than a RAT-specific threshold, the UE 400 can be configured to determine if a neighbor LTE eNodeB base station is available to support a VoLTE call, at decision block 842. In a situation where a neighbor eNodeB is available to support a VoLTE call, at operation block 844, the UE 400 can reselect to the neighbor eNodeB, and then the corresponding VoLTE call can be established.

However, in a situation where a neighbor eNodeB is not available to support a VoLTE call, then at operation block 846, a neighbor legacy network base station can be identified for network reselection, prior to establishing a voice call associated with the call initiation event. Thereafter, at operation block 848, the UE 400 can autonomously reselect to the identified neighbor legacy network base station, e.g., in the manner described above. Subsequently, at operation block 850, the UE 400 can establish a circuit-switched voice call associated with the call initiation event via the neighbor legacy network base station.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method of causing a network cell transition for a mobile device at call initiation, the method comprising:
   by the mobile device, while connected to a serving base station of a Long Term Evolution (LTE) network that supports voice over LTE (VoLTE) communication:
   determining a radio signal power metric for the serving base station and at least one neighbor base station;
   detecting a call initiation event for a VoLTE call;
   in response to detecting the call initiation event, evaluating the radio signal power metric for the serving base station by comparing the radio signal power metric for the serving base station to an LTE radio access technology (RAT) specific threshold, wherein the LTE RAT specific threshold is greater than a RAT generic threshold associated with measurement reporting events and applicable to multiple RATs;
   when the radio signal power metric for the serving base station satisfies the LTE specific threshold, establishing the VoLTE call via the serving base station; and
   when the radio signal power metric for the serving base station does not satisfy the LTE RAT specific threshold and satisfies the RAT generic threshold:
      transitioning the mobile device from the serving base station to a neighbor base station of a non-LTE legacy network; and
      establishing a voice call associated with the call initiation event via the neighbor base station of the non-LTE legacy network.

2. The method of claim 1, wherein the mobile device is a multi-mode communication device that is capable of VoLTE communication with the serving base station.

3. The method of claim 1, wherein the transitioning of the mobile device from the serving base station to the neighbor base station of the non-LTE legacy network occurs via a network handover procedure when the mobile device is in an LTE radio resource control (RRC) connected mode.

4. The method of claim 3, wherein the network handover procedure comprises:
   generating an exaggerated measurement report comprising a deflated radio signal power metric value associated with the serving base station that is lower than measured or an inflated radio signal power metric value associated with the neighbor base station of the non-LTE legacy network that is higher than measured; and
   transmitting the exaggerated measurement report to the serving base station to trigger a handover of the mobile device from the serving base station to the neighbor base station of the non-LTE legacy network prior to establishing the voice call.

5. The method of claim 1, wherein the transitioning of the mobile device from the serving base station to the neighbor base station of the non-LTE legacy network occurs via a network reselection procedure when the mobile device is in an LTE RRC idle mode.

6. The method of claim 1, wherein the LTE RAT specific threshold is a network cell transition threshold that is stored at the mobile device, and wherein the RAT generic threshold is a RAT generic network handover threshold.

7. A wireless communication device comprising:
   a radio frequency (RF) circuit;
   one or more processors communicatively coupled to the RF circuit; and a memory communicatively coupled to the one or more processors and storing computer-executable instructions that, when executed by the one or more processors, cause the wireless communication device, while connected to a serving base station of a Long Term Evolution (LTE) network that supports voice over LTE (VoLTE) communication, to:

detect a call initiation event for a VoLTE call;

measure a reference signal received power (RSRP) received from a serving base station of the LTE network;

compare the measured RSRP received from the serving base station to an LTE radio access technology (RAT) specific threshold, wherein the LTE RAT specific threshold is greater than a RAT generic threshold associated with measurement reporting events and applicable to multiple RATs;

establish the VoLTE call via the serving base station, when the RSRP equals or exceeds the LTE RAT specific threshold; and when the RSRP received from the serving base station is less than the LTE RAT specific threshold and exceeds a RAT generic threshold:

transition from the serving base station to a neighbor base station of a non-LTE legacy network; and establish a voice call associated with the call initiation event via the neighbor base station of the non-LTE legacy network.

8. The wireless communication device of claim 7, wherein the wireless communication device is a multi-mode communication device that is capable of VoLTE communication and circuit-switched voice communication.

9. The wireless communication device of claim 7, wherein the transition from the serving base station to the neighbor base station of the non-LTE legacy network occurs via a network handover procedure when the wireless communication device is in an LTE radio resource control (RRC) connected mode.

10. The wireless communication device of claim 9, wherein the network handover procedure comprises the wireless communication device:

generating an exaggerated measurement report including a deflated RSRP associated with the serving base station that is lower than measured or an inflated RSRP associated with the neighbor base station of the non-LTE legacy network that is higher than measured; and transmit the exaggerated measurement report to the serving base station to trigger a handover from the serving base station to the neighbor base station of the non-LTE legacy network prior to establishing the voice call.

11. The wireless communication device of claim 7, wherein the transition from the serving base station to the neighbor base station of the non-LTE legacy network occurs via a network reselection procedure when the wireless communication device is in an LTE RRC idle mode.

12. An apparatus configurable for operation in a mobile device, the apparatus comprising:

one or more processors communicatively coupled to a memory storing instructions that when executed by the processors cause the mobile device, while connected to a serving base station of a Long Term Evolution (LTE) network that supports voice over LTE (VoLTE) communication, to perform a method comprising:

determining a radio signal power metric for the serving base station and at least one neighbor base station;

detecting a call initiation event for a VoLTE call;

in response to detecting the call initiation event, evaluating the radio signal power metric for the serving base station by comparing the radio signal power metric for the serving base station to an LTE radio access technology (RAT) specific threshold, wherein the LTE RAT specific threshold is greater than a RAT generic threshold associated with measurement reporting events and applicable to multiple RATs;

when the radio signal power metric for the serving base station satisfies an LTE radio access technology (RAT) specific threshold, establishing the VoLTE call via the serving base station; and when the radio signal power metric for the serving base station does not satisfy the LTE RAT specific threshold and satisfies the RAT generic threshold:

transitioning the mobile device from the serving base station to a neighbor base station of a non-LTE legacy network; and establishing a voice call associated with the call initiation event via the neighbor base station of the non-LTE legacy network.

13. The apparatus of claim 12, wherein the transitioning of the mobile device from the serving base station to the neighbor base station of the non-LTE legacy network occurs via a network handover procedure when the mobile device is in an LTE radio resource control (RRC) connected mode.

14. The apparatus of claim 12, wherein the network handover procedure comprises:

generating an exaggerated measurement report comprising a deflated radio signal power metric value associated with the serving base station that is lower than measured or an inflated radio signal power metric value associated with the neighbor base station of the non-LTE legacy network that is higher than measured; and transmitting the exaggerated measurement report to the serving base station to trigger a handover of the mobile device from the serving base station to the neighbor base station of the non-LTE legacy network prior to establishing the voice call.

15. The apparatus of claim 12, wherein the transitioning of the mobile device from the serving base station to the neighbor base station of the non-LTE legacy network occurs via a network reselection procedure when the mobile device is in an LTE RRC idle mode.

\* \* \* \* \*